United States Patent
Carlson

[11] 3,786,417
[45] Jan. 15, 1974

[54] SCHEME FOR MAPPING MECHANICAL TRANSLATION TO A RELATIVELY ARBITRARY INDEX TABLE

[75] Inventor: Carl O. Carlson, Kettering, Ohio

[73] Assignee: The National Cash Register Company, Dayton, Ohio

[22] Filed: May 8, 1972

[21] Appl. No.: 251,122

[52] U.S. Cl. ...... 340/147 R, 340/325, 250/219 DR, 235/61.11 E
[51] Int. Cl. ............................................ G06k 7/10
[58] Field of Search ............... 340/380, 325, 147 R, 340/153; 235/61.11 E; 250/219 DR, 219 FR, 219 DQ, 219 Q, 219 D, 219 DC; 350/96 B

[56] References Cited
UNITED STATES PATENTS

| | | | |
|---|---|---|---|
| 3,299,418 | 1/1967 | Treseder | 340/324 |
| 3,531,649 | 9/1970 | Sather | 235/61.11 E |
| 3,655,949 | 4/1972 | Rinn | 235/61.11 E |
| 3,659,110 | 4/1972 | Gingras et al. | 250/219 Q |
| 3,704,068 | 11/1972 | Waly | 350/96 B |

*Primary Examiner*—Donald J. Yusko
*Attorney*—J. T. Cavender et al.

[57] ABSTRACT

Apparatus for registering or indexing in sequential manner the position of microimages onto a table of human readable information, wherein optical fibers carry light from a masked source to an index board for rapidly obtaining the desired information. The source of light is coupled to the microimage carrier in an arrangement wherein movement of the carrier positions the light source to pick up desired points or locations and thereby project the light through the optical fibers to the index board to indicate relative positions of the microimages.

23 Claims, 5 Drawing Figures

PATENTED JAN 1 1974 3,786,417

SCHEME FOR MAPPING MECHANICAL TRANSLATION TO A RELATIVELY ARBITRARY INDEX TABLE

BACKGROUND OF THE INVENTION

In the matter of information storage and retrieval systems, efforts are constantly being made to improve capability and speed of operation so as to obtain such information in an accurate and rapid manner. The use of optical fiber elements to transmit luminous signals is known in the prior art wherein certain desired information is selectively and rapidly carried from one surface to another. For example, an orthogonal array of the input ends of a bundle of light-conductive elements are divided into columns and rows and the opposite ends are disposed along the periphery of a disk wherein a scanner rotates and thereby picks up pulses from light sources next to the disk. A register or counter is then actuated to store or display the reading of two counters, one for the number of rows and the other for the number of pulses in a row, all as shown and described in U.S. Pat. No. 3,538,312.

Additionally, U.S. Pat. No. 3,403,263 discloses a method and apparatus for optical fiber curve followers including method and apparatus for making position scale therefor, whereby a scanning head containing a plurality of optical fibers in a closely grouped array is positioned to pick up light reflected from an illustrated curve when associated with individual photocells.

SUMMARY OF THE INVENTION

The present invention relates to apparatus for registering or indexing the position of information in image form corresponding to human readable information, and more particularly to apparatus utilizing optical fiber elements to transmit information by means of luminous signals. A matrix board containing a plurality of apertures in row and column fashion is positioned over a movable source of light and optical fibers are trained from the apertures in the matrix board to apertures in an index board or strip alongise a microform reader screen. The microform carrier or holder, containing the microform with microimages thereon, is coupled to a light source holder to enable movement of the light source holder in a direction and distance corresponding to that of the microform holder.

In one embodiment of the invention, an index board is supported adjacent the microform reader, such board containing a listing or table of human readable information corresponding to the information in microimage form. After inserting the microform into the reader, it is desirable to be able to locate the desired information accurately and as rapidly as possible. Since the apertures in the matrix board correspond in a one-to-one ratio with the rows and columns of images on the microform, a projection of the light source through the apertures in the matrix board provides an indication of the position of such microimages onto the index board, by reason of the light traveling through the optical fibers. The arrangement is such that only a small portion of the light from the source is admitted to the input ends of the fibers by reason of a slotted mask carried above the light source and movable therewith. The slot allows illumination of only a portion of the apertures in the matrix board, this being a single aperture in one column, or it may include the coverage of several apertures in a column. When the microform carrier is moved from left to right, the illumination on the index board moves from column block to column block in a top to bottom and left to right pattern. The reverse occurs when the microform holder is moved from right to left. In this embodiment, the arrangement includes the X and Y coordinate positioning and indication of the desired information.

In a simpler embodiment of the invention, similar construction as that just described provides an indication of the microimage position in the X direction. In this concept, the light source, the matrix board, and the fiber optics are contained within a smaller enclosure and function as above, except that an index strip is attached at one side of the reader screen to indicate the column of a particular image. The index strip has apertures therein corresponding to the number of columns of microimages and is useful to rapidly indicate to the operator the position of the microform.

In view of the above discussion, the principal object of the present invention is to provide apparatus for mapping mechanical translation to a relatively arbitrary index table.

Another object of the present invention is to provide an indication to the operator of the position of information in image form so as to enable rapid retrieval of such information.

An additional object of the present invention is to provide means for transmitting microimage information by optical fibers to a human readable pattern.

A further object of the present invention is to provide a microform reader with apparatus for accurately and rapidly retrieving microimage information.

Additional features and advantages of the present invention will become apparent and fully understood from a reading of the following description taken together with the annexed drawings, in which.

Figure 1:
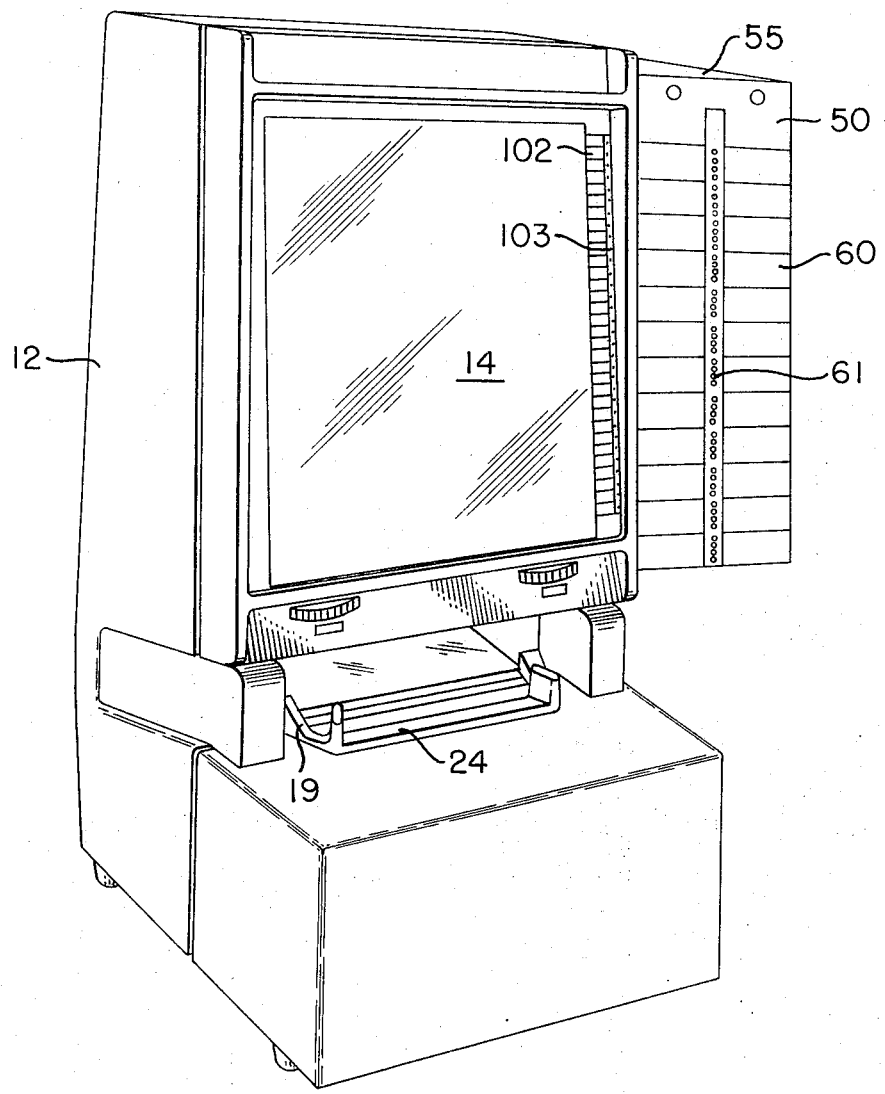
FIG. 1 is a front perspective view of a microform reader incorporating the subject matter of the present invention.

Referring now to FIG. 1, a microform reader or viewer of the portable type incorporating the structure of the present invention includes a housing 12 of generally rectangular box-shape to contain the parts of the reader. As is well-known, a microform reader basically has a microform image holder or carrier, a projection lens and optical system, and a screen for viewing the enlargement of the microimage. The details of the projection lens and optical system are not shown, as they form no part of the present invention; however, suffice it to say that the optical system includes a source of light, the projection lens, and the required mirrors to direct the projected image from the film or transparency along a path onto the screen 14. As is also well-known, the microforms viewed with a reader of this type are in the nature of cards, sheets, or the like containing information from a plurality of pages of information in the form of reduced images which are normally unreadable. A single card or sheet may contain a hundred or more of such reduced images, depending upon the size of the card and the reduction ratio thereof. The format of the card is such that the reduced images are positioned in a row-and-column arrangement which may be in numerical order corresponding to the pages in a book or publication.

It is, of course, highly desirable that, once a microform is inserted into the reader and properly positioned therein, certain information be made quickly available to be observed on the screen 14 — this availability being accomplished in a matter of seconds so as to rapidly retrieve such information. Provisions are made in certain styles of readers to incorporate fast-acting microform insertion and removal features, however this fast-acting aspect covers only the before-and-after reading operation.

In the present invention, provision is made to load and unload the microform selected to be read, and this generally is in the nature of a carrier which is drawn forwardly or toward the operator, to insert the form and then the carrier is pushed rearwardly to position the form for reading, after which the carrier is again pulled forwardly to remove the microform therefrom. The microform carrier comprises a framework 19 (FIG. 2) for supporting a lower transparent plate 20, an upper transparent plate (not shown), and a handle 24 (FIG. 1) for use by the operator in moving the carrier to the desired fore-and-aft and side-to-side positions, there being a microform 26 with micro-images shown in grid manner and with the microform in place on the lower transparent plate 20. The handle 24 is, in effect, an extension of the carrier framework 19, so that the carrier itself is movable as a unit in the required directions to position the microform in the desired location for viewing a selected image thereon.

The format of a plurality of microimages 30 on the microform 26 is shown in a row-and-column arrangement which may correspond in successive manner with the pages of a book, this arrangement being the one most suitable, although others may be feasible. The row and column or matrix arrangement also follows the operation and movement of the carrier wherein movement of the carrier in one direction positions the microform for retrieving certain desired information, and movement in another direction positions the microform for other desired information. In other words, the microimage format determines the direction of movement of the carrier for the desired information.

Since the microimages 30 contain information which is normally unreadable, the images of a desired or predetermined selection must be projected onto the screen 14 for reading or viewing. The structure of the present invention provides for accurately and rapidly indexing the information from the microform for the operator to use in retrieving such desired information.

Figure 2:
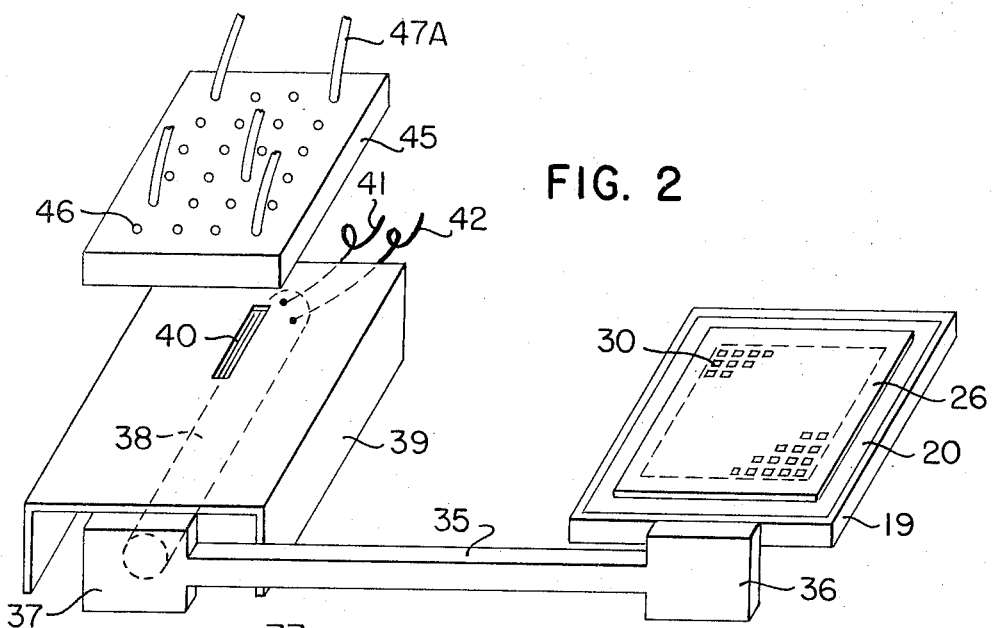
FIG. 2 is a schematic representation of the means for transmitting position indication from the microimage form.

Referring now to FIG. 2, a coupling or connection 35 is secured at one end 36 thereof to the microform carrier 19, the other end 37 being attached to an assembly carrying a source of radiant energy 38 and a mask 39. The mask 39 is preferably in the form of a shield having a slotted opening 40 therein for permitting energy to be transmitted therethrough in limited manner, or in the case of a light source to permit only limited illumination to pass to an area or space above the mask. Leads 41 and 42 are connected to the light and to a suitable supply.

Immediately above the mask 39 is a matrix board 45 having a plurality of apertures 46 therein, the apertures holding a plurality of light transmitting elements, in the form of optical fibers 47A. The input ends of the optical fibers are positioned within the apertures 46 to be substantially flush with the bottom surface of the matrix board 45, although they may extend beyond such surface if the need arises. The matrix board 45 also serves as a means for spacing the fibers 47A in positions corresponding to the rows and columns of the microimages 30 on the microform 26 so that one fiber 47A essentially picks up illumination from the light source for one microimage or representation thereof.

Figure 5:
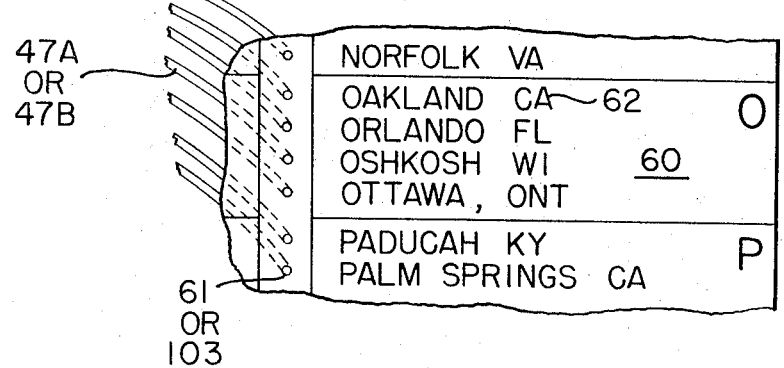
FIG. 5 is an enlarged view of a portion of the display or index table shown in FIG. 1.

The optical fibers 47A extend from the matrix board 45 to an index board or display surface 50 (FIG. 1), such display board being attached to the side of the reader 12 for easy and rapid reading thereof. The optical fibers 47A, therefore, are trained from the matrix board 45, adjacent the microform carrier 19, in a path rearwardly of the screen and into an enclosure 55 on the right side of the reader and rearward of the display board 50. The display board is positioned at an angle forward of the front of the reader for easy observation by the operator. As seen in FIG. 5, which illustrates an enlargement of one of the sections 60 of the display board 50, a plurality of apertures 61 in the board permit the entrance of the output ends of the optical fibers, each aperture and fiber being positioned adjacent, in the present invention and as shown, the name of a city 62, such as Oakland, Cal.

It is thus seen that the matrix board 45 contains apertures 46 spaced to correspond with the rows and columns of microimages 30 on the microform 26, the apertures 46 containing the ends of the optical fibers 47A, and which fibers extend to positions adjacent readable information on the index board 50. In the present invention, each microimage 30 contains information concerning or related to the city named, whether it be history, economics, or the like, or information concerning travel schedules for use by transportation enterprises. One such use or practice may be in the form of flight schedules to and from a city displayed on the board.

Referring back to FIG. 2, the slotted opening 40 permits illumination from the light source 38 to extend across four of the apertures 46 in the matrix board 45 so that, at any given time, four of the fibers 47A are transmitting light from the matrix board 45 to the display board 50, wherein the transmitted light is observed as four spots of light emerging from apertures 61. Upon movement of the microform carrier 19, the spots of light at apertures 61 appear to travel in a direction up and down the display board 50 thereby indicating to the operator, the position of the microform 26 in relation to information desired to be read. Although only two columns of cities are shown on the display board 50, additional columns could be attached and, likewise, additional columns of cities or other format could be attached to the left side of the reader for greater capacity.

One arrangement of the present invention provides for a path of travel of the light spots on the display board, wherein upon movement of the microform carrier 19 from left to right, the illumination on the display board moves or "jumps" from one column to another column in a top-to-bottom and left-to-right sequence. The reverse occurs when moving the microform carrier 19 from right to left. Of course, when the carrier 19 is moved in an out-and-in or fore-and-aft direction the light spots on the display board 50 follow the pattern of the microimage grid.

As mentioned above, the transmitted light is observed as four spots of light emerging from apertures 61. If the carrier 19 is so positioned that any one of the microimages 30 relating to one of the group of cities starting with "O" (as seen in FIG. 5) is located in the optical path of the lens assembly and therefore an enlarged image thereof showing on the screen 14, it is certain that the slot 40 is located so as to permit light to pass therethrough, and in turn be transmitted through the corresponding fiber 47A to the appropriate aperture 61 adjacent the name of the city as readable on the display board 50. Depending on the precise position of the carrier 19, the slot 40 permits light to be transmitted to four fibers 47A which, for example, may emerge as four spots of light adjacent the four "O" cities. If, of course, the carrier 19 is positioned a slight distance in one or the other direction, the four spots of light may show up adjacent an "N" city and three "O" cities or two "O" cities and two " P" cities, or any four of the other cities having the desired information on the microform 26 and corresponding to the named cities on the display board section 60. As the carrier 19 is moved about, the spots of light move up and down the display board to indicate to the operator the position and direction of movement which is required to get to the desired information.

A further comment on the length of the slotted opening 40 is that the front of the opening does not and cannot be moved inwardly sufficient to cover the inward or last row of the apertures 46 in the matrix board 45, so that at least one fiber is always "on" or transmitting light to be observed on the display borad 50. In other words, if the carrier 19 is maximally rearwardly positioned and then is moved in a side-to-side direction, the forward portion of the slot 40 permits light to be transmitted through the rearmost aperture 46 in moving across the corresponding columns of microimages. A quick glance at the display board 50 will show only one spot of light at any one time. Of course, if the carrier is pulled forward slightly, the slot 40 will be positioned over two, three, or four apertures, depending upon extent of movement, and a corresponding number of spots of light will appear at the display board 50. In this manner the operator always is knowledgeable of the approximate position of the microform 26. The position of the carrier 19 and of the microform 26 thus is readily seen by observing the position and the movement of the spots of light in a pattern of illumination emitting from apertures 61 and which are directly associated with the readable information on the sections 60 of the display board.

Figure 3:
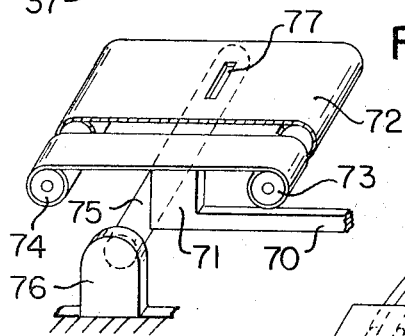
FIG. 3 is a schematic representation of a modification of a portion of the structure shown in FIG. 2.

As mentioned above, the light source 38 and the mask 39 are attached to the microform carrier 19 and move therewith. Another aspect of the present invention is shown as a partial view in FIG. 3 wherein a coupling member 70 is secured to the carrier 19, in similar manner as end 36 of coupling 35, and member 70 is attached at end 71 to a mask 72 carried under tension or taut conditions around rollers 73 and 74, such rollers being spring loaded or the like so that the mask is movable in a straight path from one roller to the other. In this case the light source 75 is fixed by means 76 as shown. In similar manner as with mask 39, the mask 72 includes a slotted opening 77 therein for permitting limited illumination to pass therethrough to the input ends of the optical fibers 47A in the matrix board 45. Depending on particular or desired conditions, the structure of the invention may therefore include alternate provision for moving either the light source and the mask, or to move the mask only, to obtain the results.

Figure 4:
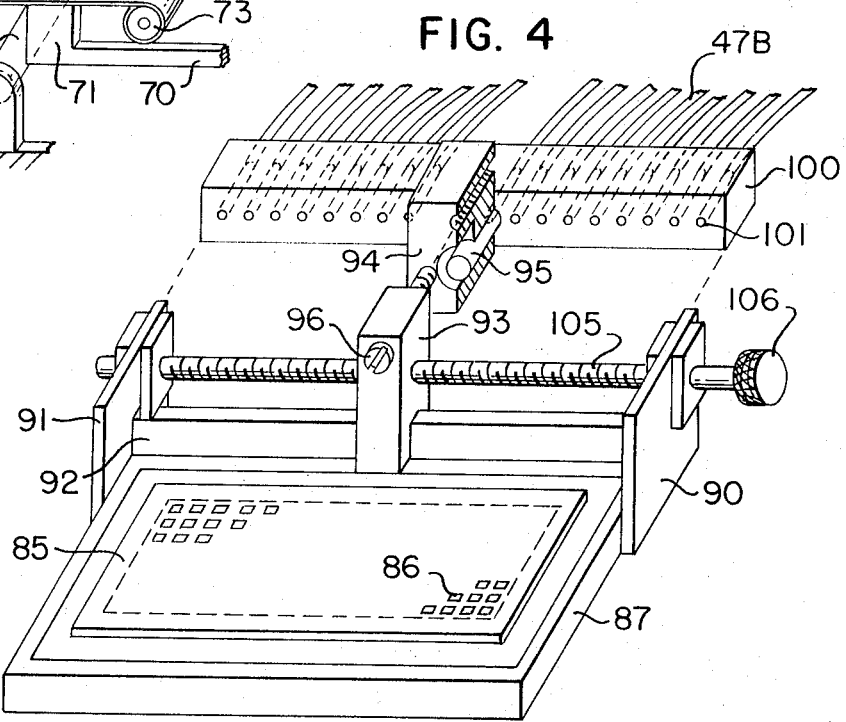
FIG. 4 is a schematic representation of a modification of the means for transmitting position indication from the microimage form.

A modification of the invention is shown in FIG. 4 wherein a simpler structure is used to perform similar function as described heretofore, and wherein a microform 85 with micro-images 86 thereon is held by a carrier 87 movable in a right-to-left or side-to-side direction. In this modification, it is desirable to indicate the column of images 86 onto a display or index strip. Secured between side frames 90 and 91 on the rearward portion of the carrier 87 is a guide 92 along which slides a block 93, the block 93 having fixed thereto (although shown apart therefrom for purposes of illustration) a mount or support 94 for a light source 95, the support being secured to the block 93 by means 96. Immediately rearward of the support 94 is a mounting block 100 having a plurality of apertures 101 therein, the apertures holding one end of optical fibers 47B with the fibers being trained from the block 100, along the rear of the reader, and to an index strip 102, (FIG. 1). The index strip 102 has a plurality of sections with apertures 103 therein for holding the other end of fibers 47B similar to that shown for fibers 47A, as in FIG. 5. The sections of the strip 102 are marked numerically from top to bottom and correspond to the columns of microimages 86 on the microform 85. Although not shown in FIG. 1, each of the sections of the index strip includes only an aperture therein for the end of the fiber 47B, (see FIG. 5) and a numeral 5 or 6 in place of a letter, such as O or P as shown. It is thus seen that as the microform holder 87 is moved in a side-to-side direction, the fibers 47B pick up the light and transmit illumination to the index strip 102 to be observed as light spots thereon by the operator. These light spots provide the operator with a rapid indication, by glancing at the strip 102, of the location or column of the microimage in relation to the projection lens assembly.

Means is provided for adjusting the position of the light support 94 in relation to a particular aperture in the block 100, such means including a threaded rod 105 inserted through the side frames 90 and 91, and additionally threaded through the block 93, the rod having a knob 106 to be operated as required. If the light 95 is not prefectly aligned with a particular aperture 101, the knob 106 is turned slightly to make the correction. Additionally, the opening in support 94 for the light 95 may be oval-shaped or elongated to correct for any uneven movement of the light when traveling in the side-to-side direction with the carrier 87.

In the practice of the invention, whenever the microform holder 19 is moved in the X and/or the Y direction, the spots of light at the output ends of the optical fibers 47A, at the sections 60 of the display board 50, appear to the operator and move correspondingly to indicate the particular positions of selected or predetermined locations of the microimages. In this manner the operator obtains a "coarse" tuning in the operation of the reader to determine the area of desired microimages and thereby has knowledge of which direction to move the holder 19, whereupon the "fine" tuning is accomplished by observing the enlarged images on the screen 14.

It is thus seen that herein shown and described is a scheme for mapping mechanical translation to a relatively arbitrary index table to provide for rapid retrieval of information. While the invention has been shown and described as relating to a microform reader for obtaining "coarse" tuning in the operation thereof, the concept may apply to other areas of information retrieval. The apparatus enables the accomplishment of the objects and advantages mentioned above, and while certain modifications of the invention have been disclosed herein, other variations may occur to those skilled in the art. It is contemplated that all such variations, not departing from the spirit and scope of the invention hereof, are to be construed in accordance with the following claims.

What is claimed is:

1. Apparatus for indicating the position of normally unreadable information onto human readable display means adjacent a reading screen comprising,
   normally unreadable information carrier means movable in fore-and-aft and side-to-side directions,
   light source means coupled with said carrier means for movement therewith,
   matrix means positioned adjacent said light source means to receive limited illumination therefrom, and
   means for carrying said limited illumination from said matrix means to said display means whereby the position of certain desired unreadable information is indicated and observable in a human readable illuminated pattern on said display means corresponding to the position of the unreadable information.

2. The apparatus of claim 1 including masking means connected with said light source means and positioned to permit limited illumination to travel to said matrix means.

3. The apparatus of claim 1 wherein said matrix means is a pattern of apertures corresponding to the format of the normally unreadable information.

4. The apparatus of claim 3 wherein said matrix means pattern and said format of normally unreadable information are arranged in columns and rows.

5. The apparatus of claim 1 wherein said means for carrying said limited illumination comprises optical fibers extending from said matrix means to said display means.

6. In microform reading apparatus for rapidly retrieving information of normally unreadable form, a reading screen, and means for indicating the position of desired information in a human readable pattern, said means comprising
   normally unreadable information carrier means movable in at least one direction,
   light source means connected with said carrier means to be moved thereby,
   stationary matrix means defining a series of apertures therein, said apertures corresponding in sequence to certain of such normally unreadable information and being positioned in relation to said movable light source means to receive illumination therefrom in successive manner upon movement of said carrier means,
   display means having a human readable pattern corresponding to the format of certain of such normally unreadable information and
   means for transmitting illumination from said apertures in said matrix means to said display means whereby a lighted pattern appears thereon corresponding to the successive illumination of said apertures.

7. In the apparatus of claim 6 including means for positioning said light source means in relation to said apertures independently of the position of said carrier means.

8. In the apparatus of claim 6 wherein said normally unreadable information comprises rows and columns of microimages and said display means is illuminated in a human readable pattern corresponding to the columns of microimages.

9. In the apparatus of claim 6 wherein said means for transmitting illumination comprise optical fibers connected with said matrix means and with said display means.

10. In the apparatus of claim 7 wherein said means for positioning includes a threaded member connected with said light source means for alignment thereof with a particular aperture in said matrix means.

11. In a microform reader having a reading screen, means for indicating the position of information of normally unreadable characteristics in a pattern observable and corresponding to the format of said information, said means comprising a microform carrier movable in at least one direction, a source of light coupled with said microform carrier to be movable therewith, a
   matrix board defining a plurality of apertures therein corresponding to columns of microimage information, said apertures being positioned to receive illumination in limited fashion, an
   index board positioned adjacent the reader screen and having a pattern of human readable information thereon corresponding to the columns of microimage information, and
   means for carrying illumination of said light source from said matrix board to said index board for observing the indication of the position of desired information along a column of microimages.

12. In the microform reader of claim 11 wherein said microform carrier is movable in at least two directions and said matrix board includes apertures therein corresponding to columns and rows of microimage information and said index board includes a pattern of human readable information corresponding to the rows and columns of said microimage information.

13. In apparatus for mapping normally unreadable information onto indexing means for indicating the position of desired information,
   means for moving said normally unreadable information in at least two directions,
   a source of light connected with said moving means,
   a stationary matrix board defining apertures therein and positioned in relation to said light source to receive illumination therefrom,
   masking means coupled with the moving means to be moved therewith, said masking means permitting limited illumination to pass to said matrix board apertures, and
   means for carrying said limited illumination from said apertures to said indexing means for displaying a limited pattern of light thereon corresponding to the position of such desired information.

14. In the apparatus of claim 13 wherein said normally unreadable information is in microimage row and column form and said matrix board apertures correspond to said rows and columns of microimages.

15. In the apparatus of claim 13 wherein said means for carrying said limited illumination comprise optical fibers connected with said matrix board and with said indexing means.

16. In apparatus for rapidly retrieving information of normally unreadable characteristics, a reading screen, and means for indicating the position of certain of such information, said means comprising information carrier means movable in at least one direction,
radiant energy source means operably associated with said carrier means for movement thereby,
display means positioned to indicate in sequential manner illumination from said radiant energy source means, and
means for transmitting limited illumination from said radiant energy source means to said display means whereby the indication of the position of certain of such information is displayed in an illuminated pattern corresponding to the position of such information.

17. In the apparatus of claim 16 wherein the means for transmitting limited illumination comprise optical fibers extending from said radiant energy source means to said display means.

18. In the apparatus of claim 16 including means for spacing said means for transmitting limited illumination in a pattern corresponding to the format of said normally unreadable information.

19. In the apparatus of claim 17 including matrix means positioned adjacent the radiant energy source means, said matrix means defining apertures therein for holding said optical fibers in a pattern corresponding to the format of said normally unreadable information.

20. In the apparatus of claim 18 wherein the means for spacing comprises an apertured matrix board.

21. In apparatus for retrieving information from a matrix of rows and columns of normally unreadable locations, a reading screen, and means for selecting predetermined locations thereon, said means comprising
carrier means for moving said matrix of locations in at least one direction, a
source of radiant energy operably associated with said carrier means, and
display means operably associated with said energy source to indicate in sequential manner an illuminated readable pattern of the sequential positioning of said predetermined locations within said matrix.

22. In the apparatus of claim 21 wherein said source of radiant energy includes a coupling with said carrier means to be moved thereby.

23. In the apparatus of claim 21 including masking means permitting limited selection of predetermined locations wherein said masking means is coupled with said carrier means to be moved thereby.

* * * * *